UNITED STATES PATENT OFFICE.

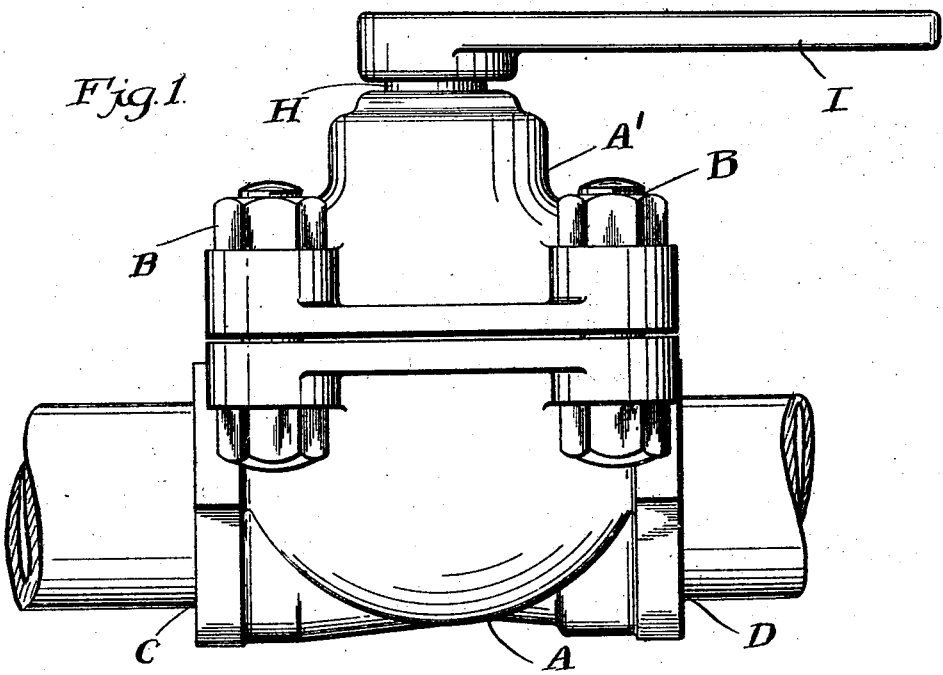
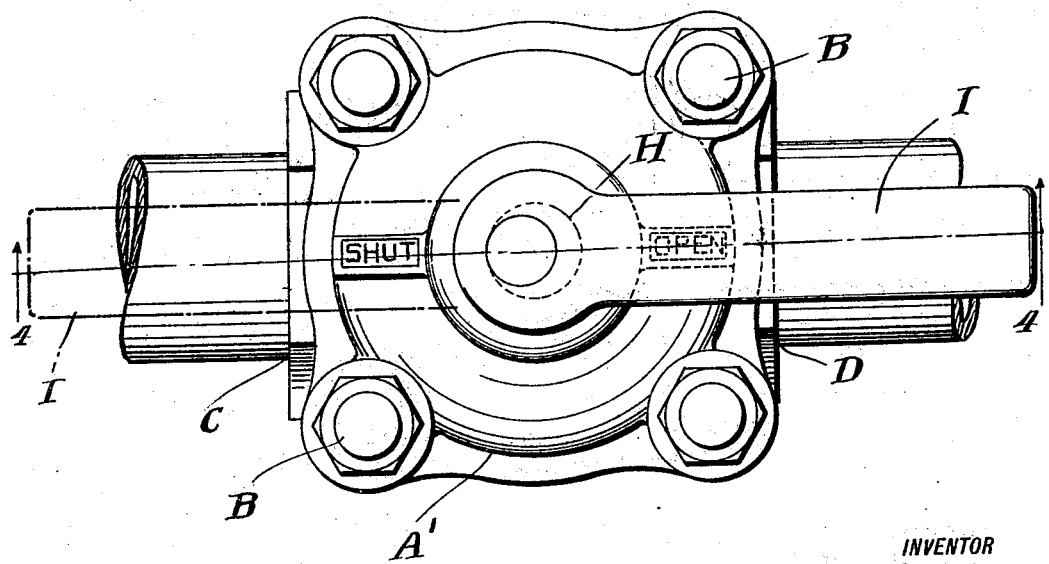

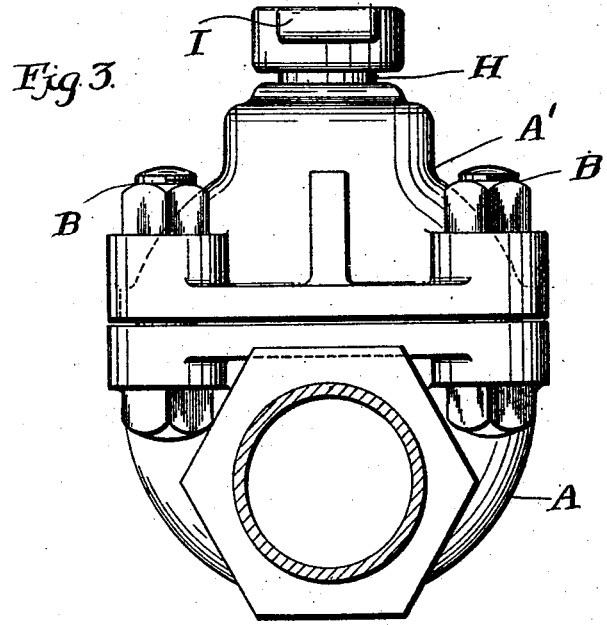
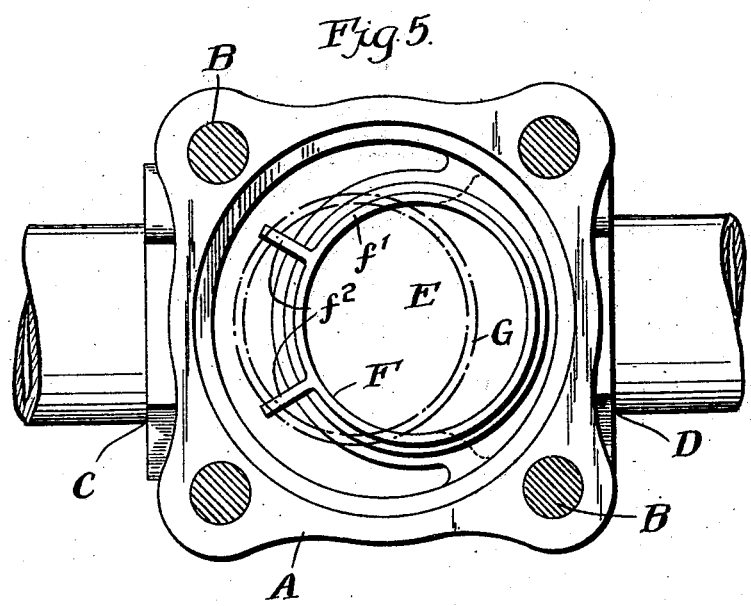

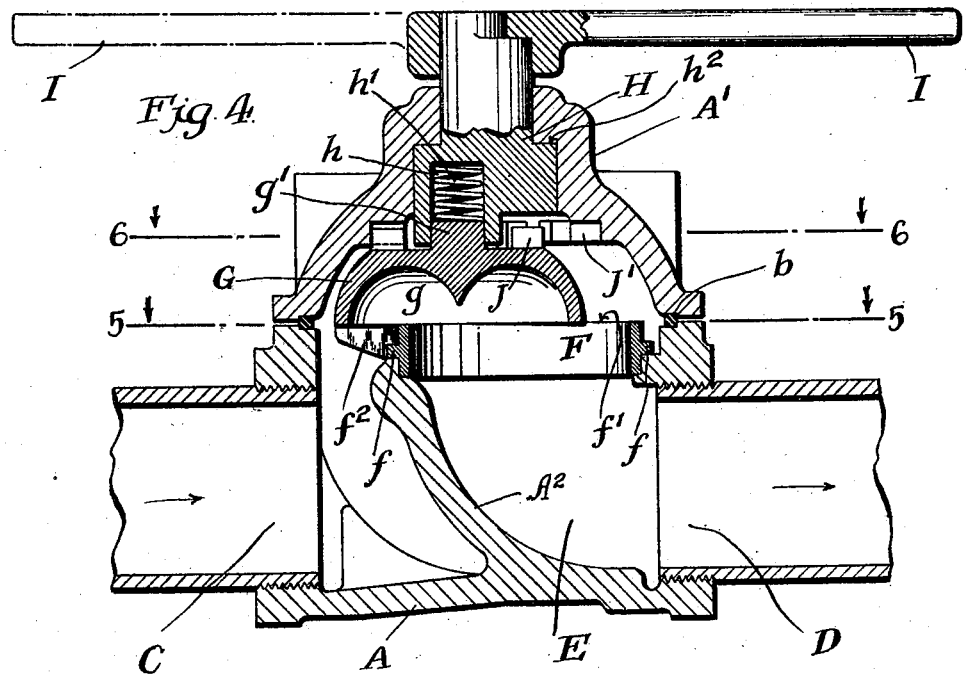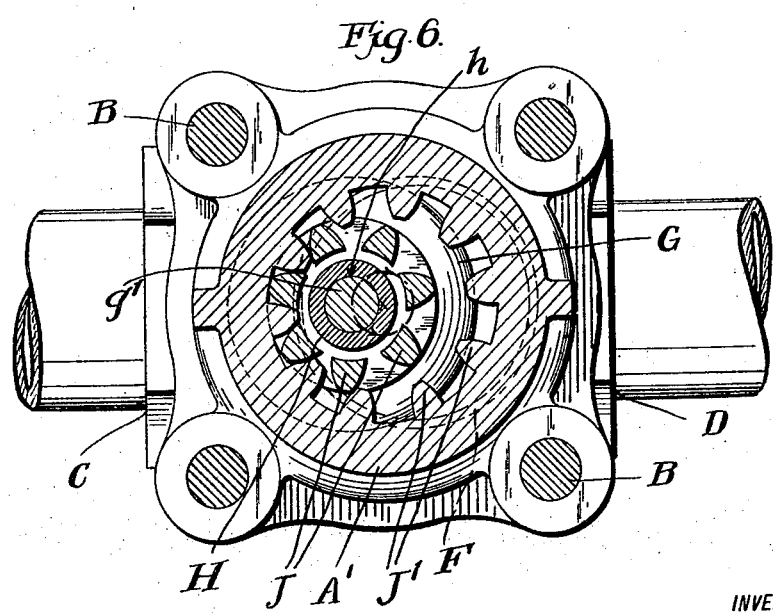

WYLIE GEMMEL WILSON, OF NEW YORK, N. Y., ASSIGNOR TO SLIDING VALVES, INCORPORATED, A CORPORATION OF DELAWARE.

SLIDE CUP VALVE.

1,413,210.   Specification of Letters Patent.   Patented Apr. 18, 1922.

Application filed January 24, 1918. Serial No. 213,463.

*To all whom it may concern:*

Be it known that I, WYLIE GEMMEL WILSON, a subject of the King of Great Britain, and a resident of New York city, in the county of New York and State of New York, have invented certain new and useful Improvements in Slide Cup Valves, of which the following is a specification.

This invention is a cup valve of the sliding type, adapted to be employed for controlling the flow of steam, gas, oil, or other material or fluid which is free from abrasive matter.

Speaking generally, the invention is a quick operating valve, the sealing member of which is a disk in substantially cup-shaped form, said disk cooperating with a valve seat, preferably annular in form, which seat may be made integral with the valve casing, or embody a separate member, as desired. In the preferred construction, the sealing member is provided with a stem which fits comparatively loosely into a socket in what may be termed the valve operating head, the valve or sealing member being normally forced to its work by a spring so positioned within the socket as to exert pressure upon the stem. The operating head is provided with an actuating member, whereby the valve may be moved, by a quick eccentric movement, into either open or closed position, and, while said operating member may partake of various forms, it is preferred, particularly in manually operated valves, to embody the same in substantially the form of a wrench.

In the preferred embodiment of the invention, positive means are associated with the structure, preferably in the form of gears, whereby different portions of the face of the sealing member are continually brought into contact with different portions of the face of the valve seat, thereby precluding undue wear on any particular parts of these faces and resulting in such uniformity of wear as to insure a tight fit between the sealing member and its seat.

Features of the invention, other than those adverted to, as well as the advantages thereof, will be apparent from the hereinafter detailed description read in conjunction with the accompanying drawings.

In the accompanying drawings I have illustrated one practical embodiment of the invention, but the construction therein shown is to be understood as illustrative, only, and not as defining the limits of the invention.

Figure 1 is a side elevation of a valve embodying the present invention.

Figures 2 and 3 are a plan and an end elevation, respectively.

Figure 4 is a longitudinal section of Figure 2.

Figure 5 is a section on line 5—5 of Figure 4, and

Figure 6 is a section on line 6—6 of Figure 4.

Referring to the drawings, A is a valve casing, preferably constructed of upper and lower parts A' and A², secured together by bolts B, with an intermediate gasket $b$ to insure an impervious joint between the parts. The inlet and outlet ports C and D, respectively, are both here shown as formed in the lower part of the casing. Inlet port C opens directly into the interior of the casing, whereas outlet port D communicates with the interior of the casing through a passage E terminating in a valve seat. In practice, the valve seat may be formed by machining the walls of the inner end of passage E, but, in the form of the invention illustrated, the valve seat is shown as formed on a removable member F. Said member is in the form of a tubular portion having a circumferential flange $f$ intermediate its upper and lower edges so that, when the lower portion of member F is seated in the inner end of passage E, flange $f$ will come to a seat on the ends of the wall of said passage and rigidly hold member F in position. The upper face $f'$ of member F forms the valve seat.

The sealing element of the valve, which will be hereinafter termed the valve disk or cup, is in the form of an inverted, cup-shaped member G, the under side of which is dished or cut out to provide a chamber $g$. The lower edge of disk G is machined to cooperate with valve seat $f'$. Movement of disk G on seat $f'$ is imparted from valve operating head H, which is journaled for rotation in the upper portion A' of the casing and is provided, off center, with a pocket $h$ into which extends the stem $g'$ of disk G. The disk is held firmly against the valve seat by means of a spring $h'$ positioned in pocket *h* and acting against the end of the stem *g'*, as clearly shown in Figure 4.

It will be noted that in the operation of the valve in addition to the spring pressure exercised by the spring *h'* to hold the cup valve member against its seat, a fluid pressure operating on the convex surface of the cup valve member will tend to cause said cup member to bear on its seat, for the reason that the surface area of said convex surface is presented to said fluid pressure to a greater extent than the reverse side of the cup; that is to say, the concave surface; in other words, the cup member will not be equally balanced between the fluid pressures on each side thereof, but there will be a greater pressure on the convex side, tending to hold the cup against its seat, even when the valve is completely open, and this pressure will increase as the valve is being closed, until it is fully closed. This condition will be apparent when it is recalled that the fluid flowing through the valve and operating on the concave surface will not exercise the same pressure as the fluid lying above the valve member.

Valve operating head H is preferably stepped-up, as at $h^2$, to sustain the tension of spring *h'*, and this stepped-up construction, at the same time, precludes leakage around the operating head, since the pressure of the fluid or liquid which the valve controls is exerted on the inner end of the operating head and forces said head to a tight and impervious joint with the casing at the stepped-up portion thereof. If desired, however, head H may have associated therewith a packing box, but this is generally unnecessary. Associated with head H, and exterior of the casing, is suitable means for rotating or oscillating said head, and, while this means may partake of various forms, it is here shown as a wrench I.

The valve, as thus far described, may be considered as complete and will operate with efficiency in the carrying out of its functions. If wrench I is rotated, through an angle of 180 degrees, from the position shown in full lines in Figures 2 and 4, wherein disk G is in a position to unseal the port and allow liquid to flow through the casing, to the position shown in dotted lines in said figures, sealing disk G will be moved from the open position shown in full lines in Figure 4 and in dotted lines in Figure 5, to a closed position wherein chamber *g* within the disk will completely register with the cylindrical valve seat member F. This travel is due to the fact that pocket *h* in head H is off-center, or exterior of the axis of rotation of said head, so that the disk will, when the head is rotated, be bodily moved, in a circular path, from open to closed position.

Disk G is, moreover, circular in form and, being free to revolve on the axis of its stem *g'*, partakes of rotation during its eccentric movement, since the portion of the disk farthest from the axis of the seat is required to travel farther than that portion of the disk nearest the center of the seat, and the latter portion is caused to lag, with the result that rotary movement is imparted to the disk. If the valve is subsequently opened by reversing the movement of wrench I, a reverse movement of the disk occurs, but the likelihood of the same spot on the disk coming back to exactly the same spot on the face is highly improbable. However, if the valve is subsequently opened by continuing to move the wrench in the same direction as it was rotated to close the valve, then the disk rotates in the same direction in opening as it did in closing, consequently never bringing the same spot on the disk in contact with the same spot on face *f'*. Thus, the wear is distributed, and, at the same time, there occurs, to a certain extent, a grinding of the faces together as the disk is opened and closed.

Accordingly, the successive operations of the disk tend to grind the sealing faces together so that the disk is, in effect, ground to its seat every time the wrench is operated. The motion which the disk has on its seat is precisely the motion which is preferred in the grinding of a disk to its seat, and, accordingly, if, in the initial assemblage of the parts, the disk is found not to fit tightly, such leaky condition can be obviated by simply imparting to head H a continued rotation for the period required to grind the disk to its seat.

While the valve as thus far described operates satisfactorily in the carrying out of its functions and the maintenance of an impervious seal when closed, a more efficient construction may be had by incorporating in the structure means for positively causing rotation of sealing disk G, so that it is not dependent for such rotation upon the tendency of a portion of said disk to lag, as hereinbefore described. A very satisfactory form of means for effecting this result positively is shown in Figures 4 and 6 of the drawings, and is embodied in the formation upon the upper face of disk G of a plurality of gear teeth J, and in the formation within the casing, and rigid therewith, of cooperating gear teeth J'. The disk operates eccentrically within the casing and is provided with a lesser number of teeth J than the number of teeth J', as will be clear from Figure 6, but the pitch of teeth J and J' is the same.

As a result of this construction, it will be manifest that the rotation of head H, and consequent bodily eccentric movement of disk G, will cause the teeth J on the disk to cooperate with the fixed teeth J' of the casing, and this cooperation will effect a positive rotation of the disk during its bodily eccentric movement. In other words the sealing member is caused to simultaneously partake of both rotary and circular movement; that is to say, a gyratory movement. With such a construction, sticking of the disk on its seat is absolutely impossible, and a thorough grinding action between the sealing faces will result.

It will be noted from Figures 4 and 5 that tubular member F, the upper edge of which forms the valve seat, is provided with two substantially radially extending arms $f^2$, the upper edges of which are flush with the valve seat $f'$. Either one or more of such arms may be provided to form guides on which the extending portion of disk G may travel when the disk is in open or partially open position, and preclude the tilting of the disk off its seat.

Additional to the advantages referred to as flowing from the construction described, other advantages, though not the exclusive ones, are the following: the valve can be manufactured at a minimum labor cost; the cylindrical structures of which the casing of the valve is composed enable it to stand high pressures with comparatively thin walls, thereby resulting in a relatively light valve; as the fluid passes between the valve disk and its seat, as well as through the port uncovered when the valve is open, the required movement of the valve across its seat, in passing from open to closed position, being less than the diameter of the outlet port, a very short crank can be used and, consequently, a relatively short operating lever will suffice to move the valve, even under high pressures; the whole interior of the valve is readily accessible by merely removing the upper portion A′ of the valve casing; the valve will handle liquids carrying solid matter of a non-abrasive nature, and this is a function not possible with an ordinary valve because the casing of the latter will become so clogged as to prevent the opening of the valve. This object can be obtained in the valve of the present invention because the case is circular and the movement of the disk is circular and concentric to the interior, and, moreover, owing to the shortness of the crank required, a relatively light pull on the operating lever will overcome great resistance to the movement of the disk and its crank pin; and, on account of the floating valve being free to rotate on its own axis and to seal the port when the valve gear moves to closed position independent of this rotary movement, and also because of the single, narrow, annular sealing face, the valve will remain tight, when used in steam and like service, much longer than ordinary slide valves of a non-rotatable character.

It will be understood that slight modifications in the structure and organization of the parts described, such as the use of equivalents, may be made without departing from the spirit or substance of the invention, and that certain features of the invention may be availed of without necessarily employing all, the scope of said invention being as broadly novel as is commensurate with the appended claims.

Having thus fully described the invention, what I claim as new, and desire to secure by Letters Patent, is:

1. A valve of the class described embodying a casing provided with a valve seat in the form of an annulus, inlet and outlet ports to the casing, a cup-shaped sealing member having a face in the form of an annulus adapted to be brought into and out of registration with the valve seat, and means for imparting simultaneous rotary and circular movement to the cup-shaped sealing member, for the purpose of opening and closing the valve.

2. A valve of the class described embodying a casing provided with a valve seat in the form of an annulus, inlet and outlet ports to the casing, a hollow sealing member having a face in the form of an annulus adapted to register with the annulus of the valve seat, and means for imparting simultaneous rotary and circular movement to said sealing member to shift it into and out of registration with the valve seat, while retaining the face of the annulus of the sealing member in substantially the same plane.

3. A valve of the class described embodying a casing provided with a slide valve seat in the form of an annulus, inlet and outlet ports to the casing, a hollow sealing member having a face in the form of an annulus adapted to register with the annulus of the valve seat, elastic means to hold said sealing member in contact with said seat, and means for imparting simultaneously rotary and circular movement to said sealing member to shift it into and out of registration with the valve seat.

4. A valve of the class described embodying a casing provided with a slide valve seat, inlet and outlet ports to and from the casing, a hollow cup shaped sealing member having a face adapted to register with the face of said seat, said sealing member being mounted to revolve freely on its own axis and means to cause the sealing member to bear on said seat with an elastic pressure and means to bodily move said sealing member in a circular path into and out of registration with said valve seat so that as said sealing member is moved in said circular path it is held by said elastic pressure in contact with said seat and due to such frictional contact it will be caused to revolve on its own axis.

5. In a valve of the class described, a casing provided with a valve seat and with inlet and outlet passages, a sealing member adapted to cooperate with said seat, and means operating on the top of said sealing member to cause the same to maintain continuous contact with its seat, said sealing member being mounted to revolve on its own axis and means to move said sealing member in a circular path the centre of which is non-coincident with the centre of the seat, so that said sealing member is brought into and out of registration with its seat.

6. In a valve of the class described, a valve casing provided with an annular valve seat, a sliding sealing member for cooperating therewith and rotatable on its own axis and simultaneously movable in a circular path, and a spring for forcing the sealing member against the valve seat, said sealing member being operable to give a maximum port opening in the valve seat while the axis of the sealing member is positioned within the contour of said port.

7. In a valve of the class described, a valve casing provided with a circular valve seat, a rotatable sliding sealing member having a cooperating circular seat bordering a corresponding shaped chamber in the sealing member and means for imparting circular movement to the sealing member directly associated therewith, the said sealing member being free to rotate about its own axis and to be shiftable from full closed to full open position by a movement less than one-half of the diameter of the said chamber.

8. In a valve of the class described, a valve casing provided with a circular valve seat having a port, and a sliding cup-shaped sealing member having a face adapted to be brought into and out of registration with said seat when gyratory movement is imparted to the sealing member so as to open and close the port, said valve, when open, permitting of the passage of fluid through the directly uncovered portion of the port, and, also, between the sealing member and the seat through the covered portion of the port.

9. In a valve of the class described, a casing provided with a valve seat and with inlet and outlet passages, a sealing member co-operating with said seat and mounted to rotate on its own axis, with means to maintain said sealing member in continuous contact with its seat and means for eccentrically moving the sealing member into open or closed position with reference to said seat.

10. A valve of the class described, embodying a casing, inlet and outlet ports thereto, an inverted substantially cup-shaped sealing member having a sealing face in the form of an annulus, a cooperating valve seat in the form of an annulus, and means cooperating with the sealing member whereby its annulus is successively forced with circular movement to different sealing positions relative to the valve seat.

11. A valve of the class described, embodying a casing, inlet and outlet ports thereto, an inverted substantially cup-shaped sealing member having a sealing face in the form of an annulus, a cooperating valve seat in the form of an annulus, and gearing cooperating with the casing and sealing member whereby a given portion of the face of the sealing member contacts during its successive closings with different parts of the valve seat.

12. In a valve of the class described, a casing provided with inlet and outlet passages and a valve seat, a rotatable sealing member cooperating with the valve seat, a head for moving the sealing member so that its axis will move in a circular path and having a loose connection therewith, gear teeth interiorly of the casing and on the sealing member which cooperate to rotate the sealing member, about its axis.

13. In a valve of the class described, a casing provided with a valve seat and with inlet and outlet passages, a sealing member provided with a stem, a rotatable head having a pocket positioned eccentrically therein for receiving said stem, whereby circular movement is imparted to the sealing member when the head is rotated, and means for imparting rotary movement to the sealing member on the axis of its stem.

14. In a valve of the class described, a casing provided with a valve seat and with inlet and outlet passages, a sealing member provided with a stem, a rotatable head having a pocket positioned eccentrically therein for receiving said stem, a spring positioned in said pocket and above the stem for forcing the sealing member to its seat, means for rotating the head to impart circular movement to the sliding member, and means for simultaneously rotating the sealing member on the axis of its stem.

15. In a valve of the class described, a casing provided with a valve seat and with inlet and outlet passages, a sealing member, a rotatable head loosely connected with the sealing member for operating the same, a yieldable member cooperating with the rotatable head and sealing member for forcing the latter to its seat, and means for imparting simultaneous rotary and circular movement to the sealing member.

16. A valve of the class described, embodying a casing having inlet and outlet passages and a valve seat in the form of an annulus, a rotary, sliding, cup-shaped sealing member having a face in the form of an annulus cooperating with the annulus of the valve seat, and arms for maintaining the face of the sealing member in the same plane as that of the valve seat whereby tilting of the sealing member is precluded.

17. In a valve of the class described, a casing having inlet and outlet ports, with a valve seat interposed therein, said valve seat having a surface in one plane which surface is adapted to cooperate with the valve, a cup shaped sealing member having a surface in one plane adapted to cooperate with the flat surface of the valve seat and of a form to register therewith to close the port, said cup-shaped sealing member mounted within the casing to co-operate with said valve seat and so mounted as to be free to revolve on its axis, means to bodily move said sealing member in a plane parallel with said plane of the valve seat and in a circular path so that at one point in said path the cup member registers with the seat member and the valve is closed, whereas at the opposite extremity of said circular path the cup member is out of register with its seat and the valve is fully open, so in the circular movement of the cup member the valve is more or less open or closed.

18. In a valve of the class described, a casing having inlet and outlet ports, with a valve seat interposed therein, said valve seat having a surface in one plane which surface is adapted to cooperate with the valve, a cup shaped sealing member having a surface in one plane adapted to co-operate with the flat surface of the valve seat and of a form to register therewith to close the port, said cup-shaped sealing member mounted within the casing to co-operate with said valve seat and so mounted as to be free to revolve on its axis, means to bodily move said sealing member in a plane parallel with said plane of the valve seat and in a circular path so that at one point in said path, the cup member registers with the seat member and the valve is closed whereas at the opposite extremity of said circular path the cup member is out of register with its seat and the valve is fully open, so in the circular movement of the cup member the valve is more or less open or closed, with means to cause said sealing member to bear on its seat with an elastic pressure.

19. In a valve of the class described, a casing having an inlet and outlet port, with a valve seat interposed therein, said valve seat having a surface in one plane which surface is adapted to cooperate with the valve, a cup shaped sealing valve or member having a surface in one plane adapted to cooperate with the flat surface of the valve seat and of a form to register therewith to close the port, said cup shaped sealing member mounted within the casing to co-operate with said valve seat, means to bodily move said sealing member in a plane parallel with said plane of the valve seat and in a circular path, means for imparting rotation to the sealing member when it is bodily moved, and means to cause said sealing member to bear on its seat with an elastic pressure, said bodily movement of said sealing member operating to open the valve full at 180° of said movement and to close the same on the completion of said cycle.

20. In a valve of the class described, a casing having inlet and outlet ports, with a valve seat interposed therein, said valve seat having a surface in one plane which surface is adapted to co-operate with the sealing member, a cup-shaped sealing member having a surface in one plane adapted to co-operate with the flat surface of the valve seat and of a form to register therewith to close the port, said sealing member mounted within the casing to co-operate with said valve seat and so mounted as to be capable of rotation on its own axis, means to move said sealing member in a plane parallel with said plane of the valve seat by a circular movement, means interposed between the casing and the sealing member to rotate said sealing member on its axis as the sealing member is moved in its circular path.

21. In a valve of the class described, a casing having inlet and outlet ports, with a valve seat interposed therein, said valve seat having a surface in one plane which surface is adapted to co-operate with the sealing member, a cup-shaped sealing member having a surface in one plane adapted to co-operate with the flat surface of the valve seat and of a form to register therewith to close the port, said sealing member mounted within the casing to co-operate with said valve seat and so mounted as to be capable of rotation on its own axis, means to move said sealing member in a plane parallel with said plane of the valve seat by a circular movement, means interposed between the casing and the sealing member to rotate said sealing member on its axis as the sealing member is moved in its circular path, with means to cause said sealing member to bear on its seat with an elastic pressure.

22. In a valve of the class described, a casing having inlet and outlet ports, with a valve seat interposed therein, said valve seat having a surface in one plane which surface is adapted to co-operate with the sealing member, a cup-shaped sealing member having a surface in one plane adapted to co-operate with the flat surface of the valve seat and of a form to register therewith to close the port, said sealing member mounted within the casing to co-operate with said valve seat and so mounted as to be capable of rotation on its own axis, means to move said sealing member in a plane parallel with said plane of the valve seat by a circular movement, means interposed between the casing and the sealing member to rotate said sealing member on its axis as the sealing member is moved in said circular path, with means to cause said sealing member to bear on its seat with an elastic pressure, said circular movement of said sealing member operating to open the valve fully at 180° of said movement and close the same on the completion of said cycle.

23. In a valve of the class described, a casing having inlet and outlet ports, with a valve seat interposed therein, said valve seat having a surface in one plane which surface is adapted to co-operate with the valve, a cup-shaped valve or sealing member having a surface in one plane adapted to co-operate with the flat surface of the valve seat and of a form to register therewith to close the port, said cup-shaped sealing member mounted within the casing to co-operate with said valve seat, means to bodily move said sealing member in a plane parallel with said plane of the valve seat by a circular movement without impeding the movement of said sealing member on its axis, means for rotating the sealing member on its axis as it is bodily moved, means to cause said sealing member to bear on its seat with an elastic pressure, and means to support the sealing member in the plane of the seat when it is partly removed therefrom.

24. In a valve of the class described a casing with port openings and a valve seat interposed between said ports adapted to co-operate with a sliding sealing member, a concave sealing member adapted to cooperate with said seat, and mounted to revolve on its own axis, the valve chamber being of a size to permit fluid flowing through said casing to flow past and under said sealing member and means to move said sealing member into and out of registration with said seat.

25. In a valve of the class described, a casing provided with a valve seat and with inlet and outlet passages, a concave sealing member provided with a stem, a rotatable head having a pocket positioned eccentrically therein for receiving said stem, whereby circular movement is imparted to the sealing member when the head is rotated.

26. In a valve of the class described, a valve casing provided with a circular valve seat having a port, and a sliding cup-shaped sealing member free to revolve upon its own axis and means to hold said sealing member in contact with said seat by an elastic pressure, said sealing member having a face adapted to be brought into and out of registration with said seat when movement is imparted to the sealing member, so as to open and close the port, said valve, when open, permitting of the passage of fluid through the directly uncovered portion of the port, and also between the sealing member and the seat through the covered portion of the port.

27. In a valve of the class described, a valve casing provided with a circular valve seat and a rotatable sliding sealing member having a cooperating circular seat bordering a corresponding shaped chamber in the sealing member, and means for imparting circular movement to the sealing member directly associated therewith, the said sealing member being free to rotate about its own axis and to be shifted from full closed to full open position by a movement less than the diameter of said chamber.

28. In a valve of the class described, a valve casing provided with an annular valve seat, a sliding sealing member for cooperation with said seat and mounted to freely rotate on its own axis and means to cause said sealing member to bear on said seat with an elastic pressure, and means to move said sealing member in a circular path to open and close said valve, the movement of said sealing member in said circular path operating in cooperation with said friction engagement between the sealing member and its seat to cause said sealing member to rotate on its own axis, said sealing member being operable to give a full port opening in the valve seat while a portion of the sealing member is positioned within the contour of said port.

29. In a valve of the class described, a valve casing provided with an annular valve seat a sliding sealing member for cooperation therewith, said sealing member being mounted to revolve freely on its own axis, with elastic means to cause said sealing member to bear on its seat and means to move said sealing member in a circular path into and out of registration with its seat, said sealing member being operable to give a maximum port opening while the axis of the sealing member is positioned within the contour of said port.

30. In a valve of the class described, a valve casing provided with a circular valve seat having a port, and a sliding cup-shaped sealing member having a face adapted to be brought into and out of registration with said seat, said sealing member being mounted to revolve on its own axis and means to move said sealing member into and out of registration with said seat, said valve when open, permitting of the passage of fluid through the directly uncovered portions of the port, and also, between the sealing member and the seat through the covered portion of the port.

31. In a valve of the class described a valve casing provided with a circular valve seat having a port, and a sliding cup-shaped sealing member suitably mounted to freely rotate on its own axis, having a face adapted to cooperate with said seat, with means to move said sealing member into and out of registration with said seat to open and close said port, said valve when open permitting of the passage of fluid through the directly uncovered portions of the port, and also, between the sealing member and the seat through the covered portion of the port.

32. In a valve of the class described a valve casing having inlet and outlet ports and a valve seat interposed between said ports, said seat being formed with its contact surface in one plane, a sealing member of concave form, the edge thereof adapted to cooperate with said seat and being of less size than the casing, means to hold said sealing member to its seat by an elastic pressure, with means to move said sealing member into and out of registration with said seat so that fluid passing through the casing will take a dual path, i. e., through the concavity of the sealing member and otherwise to the outlet port, so that with the initial movement of the sealing member to open the valve, an aperture for the passage of fluid will be opened at both sides of the sealing member.

33. In a valve of the class described a valve casing, a slide valve seat mounted within said casing and communicating with suitable inlet and exhaust ports, a sealing member adapted to cooperate with said seat, the same being of concave form and mounted to rotate on its own axis, with means to cause it to bear on the seat with an elastic pressure, and means to move said sealing member in an orbit, which is eccentric to the centre of the seat, so that in the course of its travel through said orbit, the sealing member registers with the seat to close the valve at one extremity of said orbit and is out of registration at the opposite extremity of said orbit.

34. In a valve of the class described a valve casing, a slide valve seat mounted within said casing and communicating with suitable inlet and exhaust ports, a sealing member adapted to cooperate with said seat, the same being of concave form and mounted to rotate on its own axis, with means to cause it to bear on the seat with an elastic pressure, and means to move said sealing member in an orbit, which is eccentric to the centre of the seat, so that in the course of its travel through said orbit, the sealing member registers with the seat to close the valve at one extremity of said orbit and is out of registration at the opposite extremity of said orbit, the casing being of a size to permit the fluid to exhaust over and under the sealing member when it is less than fully open.

35. In a valve of the class described a valve casing provided with a valve seat having a port, and a sliding concave sealing member having a face adapted to cooperate with said seat, said sealing member having an opening in one face only with means to move said sealing member into and out of registration with said seat to open and close said port, said valve when open permitting of the passage of fluid through the directly uncovered portions of the port and also between the sealing member and the seat through the covered portion of the port.

Signed by me at New York city, N. Y., this 8th day of January, 1918.

WYLIE GEMMEL WILSON.

Witnesses:
FLORENCE ATEN IVES,
MARGARET VOGEL.